(12) United States Patent
Chakmakjian et al.

(10) Patent No.: US 11,835,704 B1
(45) Date of Patent: Dec. 5, 2023

(54) OPTICAL RIFLE BORESIGHT ALIGNMENT APPARATUS AND METHOD

(71) Applicants: Stephen Chakmakjian, Fort Collins, CO (US); Samuel Lee, Raymond, NH (US)

(72) Inventors: Stephen Chakmakjian, Fort Collins, CO (US); Samuel Lee, Raymond, NH (US)

(*) Notice: Subject to any disclaimer, the term of this patent is extended or adjusted under 35 U.S.C. 154(b) by 125 days.

(21) Appl. No.: 17/508,978

(22) Filed: Oct. 23, 2021

(51) Int. Cl.
  *F41G 1/54* (2006.01)
  *G02B 23/14* (2006.01)
  *F41G 1/393* (2006.01)
  *G01B 11/27* (2006.01)

(52) U.S. Cl.
  CPC .............. *G02B 23/14* (2013.01); *F41G 1/393* (2013.01); *F41G 1/545* (2013.01); *G01B 11/27* (2013.01)

(58) Field of Classification Search
  CPC . F41G 3/323; F41G 1/54; F41G 1/545; F41G 1/393
  USPC ............................................ 42/116, 119–122
  See application file for complete search history.

(56) References Cited

U.S. PATENT DOCUMENTS

| | | | | |
|---|---|---|---|---|
| 5,060,391 A | * | 10/1991 | Cameron | F41G 3/323 42/115 |
| 5,486,913 A | * | 1/1996 | Aharon | F41G 1/545 356/153 |
| 7,292,262 B2 | * | 11/2007 | Towery | F41G 1/54 348/139 |

FOREIGN PATENT DOCUMENTS

WO    WO-2014170581 A1 * 10/2014 .............. F41A 23/16

* cited by examiner

*Primary Examiner* — Reginald S Tillman, Jr.
(74) *Attorney, Agent, or Firm* — Clifford H. Kraft (57) ABSTRACT

An optical Boresight alignment device that leverages creation of an opto-mechanical reference to the rifle barrel so that the riflescope can be used to directly measure the axis of the rifle barrel and thereby offer the necessary feedback to precisely boresight the riflescope. An illumination multiplexer module (IMM) allows the riflescope to function as an illuminated precision autocollimator with which to optically measure the barrel angle. The present invention leverages the two most accurate rifle components: the barrel and the riflescope themselves to directly measure the axes of each device, the optical (riflescope) and the mechanical (barrel). This is an improvement over existing methods by successfully using the external surface of the rifle barrel as a kinematic mechanical reference.

13 Claims, 9 Drawing Sheets

1   Rifle
2   Riflescope
3   Rifle barrel
4   Illumination multiplexer module (IMM)
5   Opto-Mechanical Module (OMM 1  Rifle
2  Riflescope
3  Rifle barrel
4  Illumination multiplexer module (IMM)
5  Opto-Mechanical Module (OMM

OPTICAL RIFLE BORESIGHT ALIGNMENT APPARATUS AND METHOD

BACKGROUND

Field of the Invention

The present invention relates generally to riflescopes, and more particularly to an optical rifle boresight alignment apparatus and method.

Description of the Problem Solved

The present invention relates to directly measuring the angle of a rifle barrel with respect to the optical axis of a mounted riflescope. Once this relationship is established, the typical and proper offsets for scope height, and ballistic drop can be added for accurate zeroing at the intended range.

At present, bore-sighting a riflescope is accomplished by referencing the riflescope orientation with respect to the barrel with various methods, both mechanical and optical. Once adjustments are made, using whatever preliminary technique is chosen, the riflescope is deemed "preliminary zeroed" or "coarse bore-sighted". Then it is necessary to send a round downrange and evaluate the accuracy of the preliminary bore-sight condition with a single or the average of several shots. The position of the hit(s) with respect to the intended target measured and used as feedback to adjust the riflescope reticle position, or the entire riflescope axis, to achieve bore-sight alignment. This sequence of shoot, measure and adjust is repeated until the shooter is satisfied with the result at the first distance which is usually 25 yards, and then the shooter may move out to whatever distance is desired as the "zero distance" for the bore-sight alignment. At that point, and the riflescope is said to have its boresight set to that rifle for the given ammunition at the chosen zero distance.

The simplest prior art preliminary alignment method is called "mechanical reticle centering". One determines the range of adjustment of the elevation and azimuth reticles and then centers each of the dials in the middle of their respective ranges of travel. This method relies on the assumption that the mechanical center provided by the manufacturer is close enough for a start. If this method is chosen, the shooter usually starts at a close range such as 25 yards and expects to the first round to hit within a one square yard patch, or less, from the targeted aim point.

The next prior art alignment method is to optically center the reticle off the exit face of the riflescope. This method is more tedious and results in no real improvement over mechanical centering. The operator holds a reflective mirror against the exit face of the riflescope and attempts to visualize both the reticle directly and its reflection off the mirror which is registered to the exit flange, or objective end, of the riflescope. The logic behind this approach is that the riflescope housing represents an assumed good mechanical fiducial. This takes some experimentation with lighting and coordinated head movement and mirror tilting for success. Once again one starts out at 25 yards within a square yard or so.

The most favored prior art historical method of preliminary bore-sighting is to simply remove the bolt of the rifle to allow the shooter to view directly down the barrel toward a distance target. The rifle must be steadied during this whole procedure either with sandbags or a good bench rest to avoid any movement. A distant and visually small and distinct target is chosen to align the axis of the barrel to the target by viewing it through the barrel entrance. The shooter then views the same target through the riflescope and aligns the reticles to the same point. For quality, the shooter reviews the view through the barrel to verify that the rifle did not move during the reticle adjustment process. Once again, the shooter starts out at 25 yards range.

There are prior art tools and inventions meant to improve either the accuracy of alignment or the ease of the preliminary alignment for the shooter. One method presents an optical target to the riflescope by installing a secondary optical device registered to the rifle barrel. Traditional methods install the device such that it is mechanically registered to the inside of the barrel using a tight-fitting cylindrical mandrel. Such mandrels are typically barrel-diameter specific. Alternatively, the device can be mechanically registered magnetically to the end or crown of the barrel. This second technique presents a smaller reference surface and is bound to be less reliable and accurate. Whether the optical device is registered to the interior of the barrel or the exit face of the barrel there are two similar approaches to these methods.

One method is a fixtured autocollimator that faces the riflescope. These autocollimators consist of a lens with a patterned reticle positioned at the lens focus such that the reticle image is collimated or projected to infinity in optical terms. The riflescope is then used to view the reticle for alignment.

The second method is to use a laser that projects a beam away from the rifle toward a distant target. The riflescope is used to view the position of the laser spot for alignment. This method is usually plagued in practice not only by the fixturing errors, but by the dimness of the and the divergence of the laser beam limiting both distance and accuracy.

SUMMARY OF THE INVENTION

Figure 1:
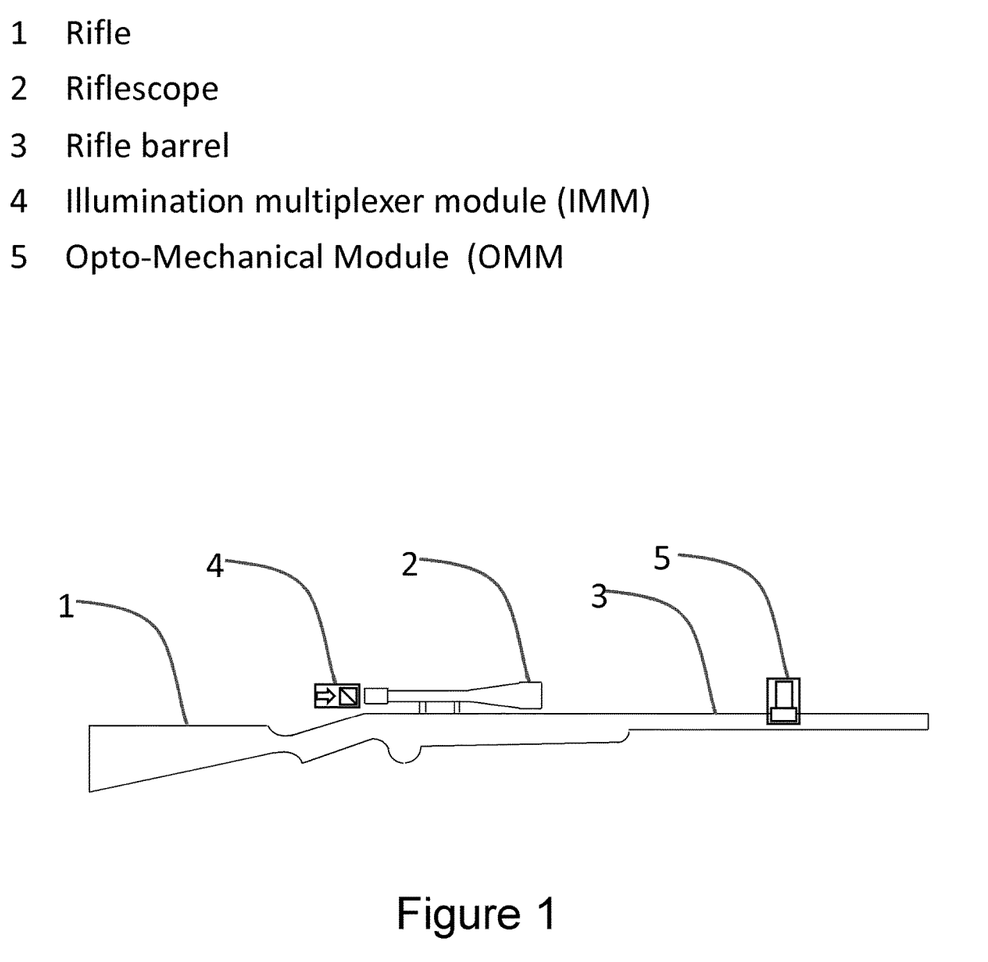
FIG. 1 shows an overview of an embodiment of the present invention.

The present invention relates to an opto-mechanical reference module OMM, 5 shown in FIG. 1. The OMM creates a link between the mechanical axis of the rifle barrel and a pre-aligned optical axis of an optical reference. A vee-clamp or other attachment member is used to mechanically and kinematically reference the exterior surface of the rifle barrel. Mounted on the vee-clamp is a precision-aligned optical component whose optical axis is made parallel to the axis of the vee during production. Therefore, when this device is clamped onto the barrel, an opto-mechanical reference contained in the OMM (mirror, autocollimator, or laser) is aligned to the barrel axis.

The present invention also includes an illuminator multiplexer module IMM, 4 in FIG. 1, which includes an optical beam-splitter that allows one to project light into the riflescope while also allowing viewing of the riflescope image. The light projected into the riflescope from the IMM picks up the shadow of the reticle which is transmitted through the riflescope and imaged to infinity in "optical image space" and then can reflect off the reference mirror surface. The beam picks up twice the angle of the riflescope axis with respect to the mirror upon reflection and returns to the riflescope. The riflescope then re-images the reticle shadow onto the reticle plane. Since the light reflects from the mirror, the image is inverted and the incidence angle is doubled. The operator now visualizes both the direct image of the reticle as well as the image of the reticle shadow which now contains information about the angle between the barrel and the riflescope. Because the aperture of the riflescope is typically 10× larger than a human eye pupil, a factor of 10× resolution improvement beyond the average human eye's 1 minute of arc resolution, is possible.

DESCRIPTION OF THE FIGURES

Attention is now directed to several drawings that illustrate features of the present invention.

Several figures and illustrations have been provided to aid in understanding the present invention. The scope of the present invention is not limited to what is shown in the figures.

DESCRIPTION OF THE PREFERRED EMBODIMENTS

A block diagram of the invention is shown in FIG. 1. The most accurate system on the rifle platform 1 is the rifle barrel 3 and the optical riflescope 2. This is because the large optical aperture of the riflescope allows for viewing far beyond the human eye. FIG. 1 also shows the addition of two elements of the present invention: the Illumination Multiplexer module (IMM) 4 and the Opto-Mechanical Module (OMM) 5.

It is helpful to review the diffractive laws of optics to understand and internalize this advantage. For this analysis it will be assumed that the quality of the optics in the riflescope are at or near diffraction limited, which means that the root-mean square total wavefront error is at or less than ¼ optical wave optical path difference (OPD) over the aperture of the optic. One can write down the equation for the diffraction-limited angular resolution:

$q=1.22 l/D$, where l—is the wavelength of light~$5.0 \times 10^7$ meters
D—is the aperture of the optics.

Most modern riflescope have a collection aperture of about 40 mm-50 mm. The human eye has an aperture of about 2 mm is bright daylight. For those two cases:

$q_{eye}$~0.3 milliradians~1 arc minute $q_{scope}$~0.012 milliradians~0.04 arc minutes Because the large aperture of the typical riflescope optical resolution is between 20 and 25 times greater angular resolution than the normal human eye, a major improvement can be achieved. The present invention leverages the riflescope as a precision autocollimator to resolve and measure small angular alignment errors between the optical axis of the reticle and the rifle barrel 3.

The present invention represents a method and apparatus to enable an ordinary riflescope to function as a precision alignment autocollimator. This is done by adding illumination and a beam-splitter to divide outgoing and returning optical beams. This device is the Illumination Multiplexer module or IMM 4 shown in FIG. 2. The IMM can be operated either with the illumination port on the side and the view port on top or with the illumination port on the top and the viewer looking straight through the side at the riflescope.

The components of the IMM 4 shown in FIG. 2A as follows: The light is provided by a light source 6 such as a flashlight or other partially or fully collimated light source. An optional diffuser 8 may be used to diffuse the filament or LED patterning as well as to fill the optical entrance pupil of the riflescope. This diffuse illumination condition provides for fully spatially incoherent illumination. A beam splitter 7 allows a portion of the light to be transmitted to the riflescope. Once the outgoing beam (OB) of light passes though the riflescope and reflects from an optical reference mirror or other device attached to the barrel, the beam-splitter 7 directs a portion of the return beam (RB) of light toward the observer.

Figure 2A:
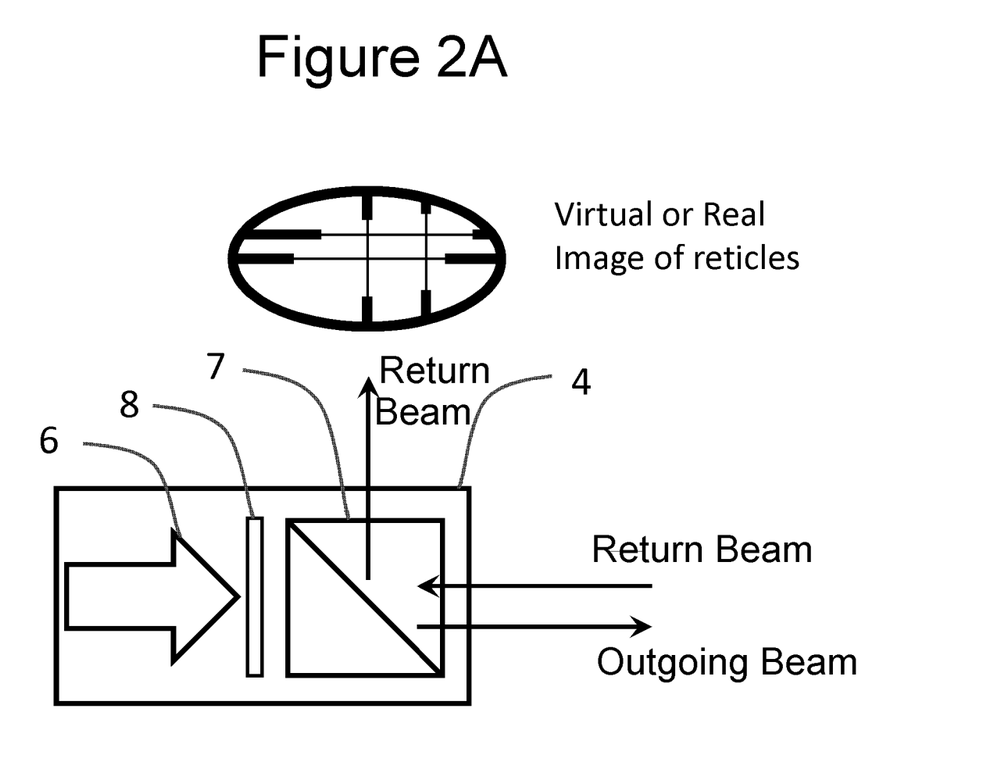
FIG. 2A shows an embodiment of the illumination multiplexer module (IMM).
Figure 2B:
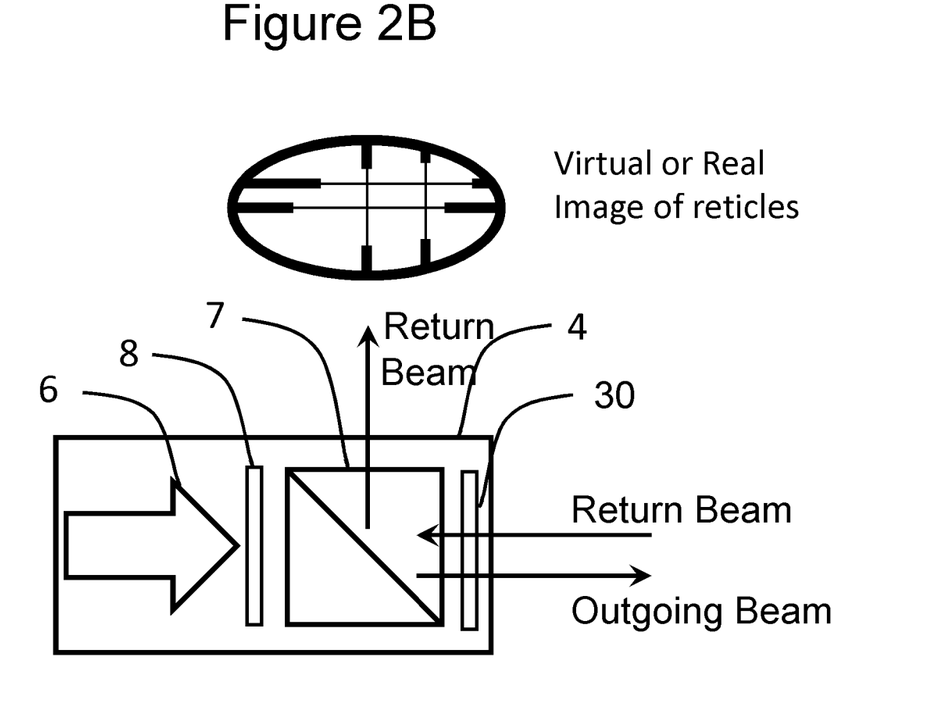
FIG. 2B shows an alternate embodiment of the illumination multiplexer module (IMM) with polarized illumination.

Alternatively, as shown in FIG. 2B, a polarizing beam-splitter (PBS) 7 in conjunction with a quarter waveplate 30 oriented at 45 degrees to the polarization axis defined by the PBS can be used to increase the efficiency by 50% by redirection all the reflected light toward the observer on the return path.

Regardless of the detailed configuration of the IMM, the return beam can be viewed directly by eye or captured on a camera or projected onto a screen to display the overlapping reticle images as shown in FIGS. 2A-2B. The IMM is required for riflescopes with simple opaque reticles. Some newer riflescopes feature etched glass illuminated reticles. These reticles provide illumination in both directions, consequently the illuminated multiplexing function of the IMM is not required to view the reticle and its reflection. The OMM can be viewed by simply turning on the illuminated reticle and looking directly into the riflescope eyepiece.

There are advantages to using a camera to capture and digitize the return images either from the IMM return port of directly from the riflescope in the case of the etched illuminated reticle. The two images of the reticle travel unique paths before hitting the observer or the camera. The conventional image of the reticle merely passes through the eyepiece portion of the scope, while the reflected reticle image passes through eyepiece portion but also double-passes through the objective portion of the riflescope. From these two unique data we may be able to evaluate each portion of the riflescope separately and quantitatively.

By digitizing the image and processing the measured width of the reticle features, it is possible process the data and measure or derive valuable optical metrics such as the line-transfer, the edge-transfer or the point-spread functions of the riflescope. These transfer functions are measures of the optical fidelity of the riflescope scope. The user is able to directly measure down to diffraction limited performance to quantify the resolving power of their riflescope. This is a very unique capability for the average shooter.

Figure 3:
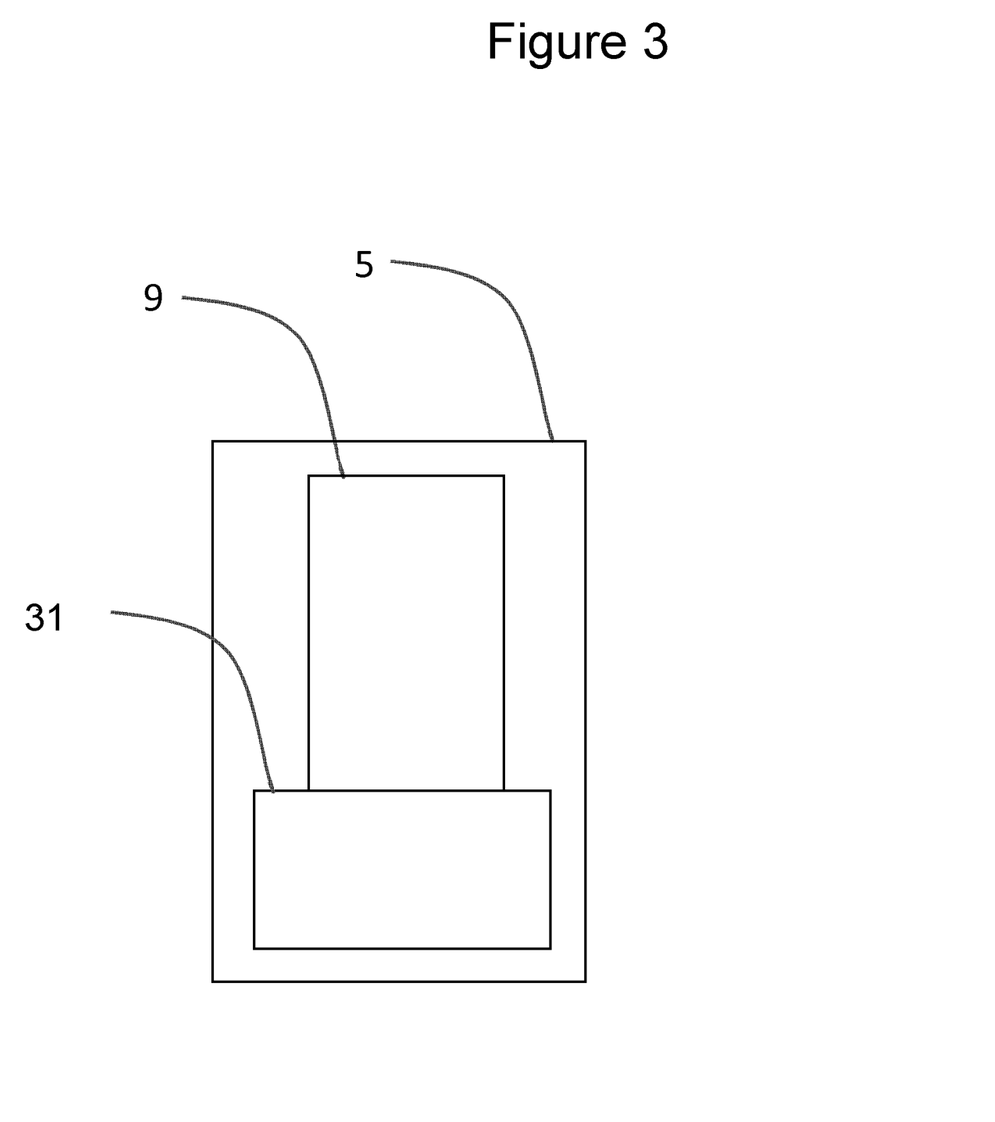
FIG. 3 shows an embodiment of the opto-mechanical module (OMM).
Figure 4:
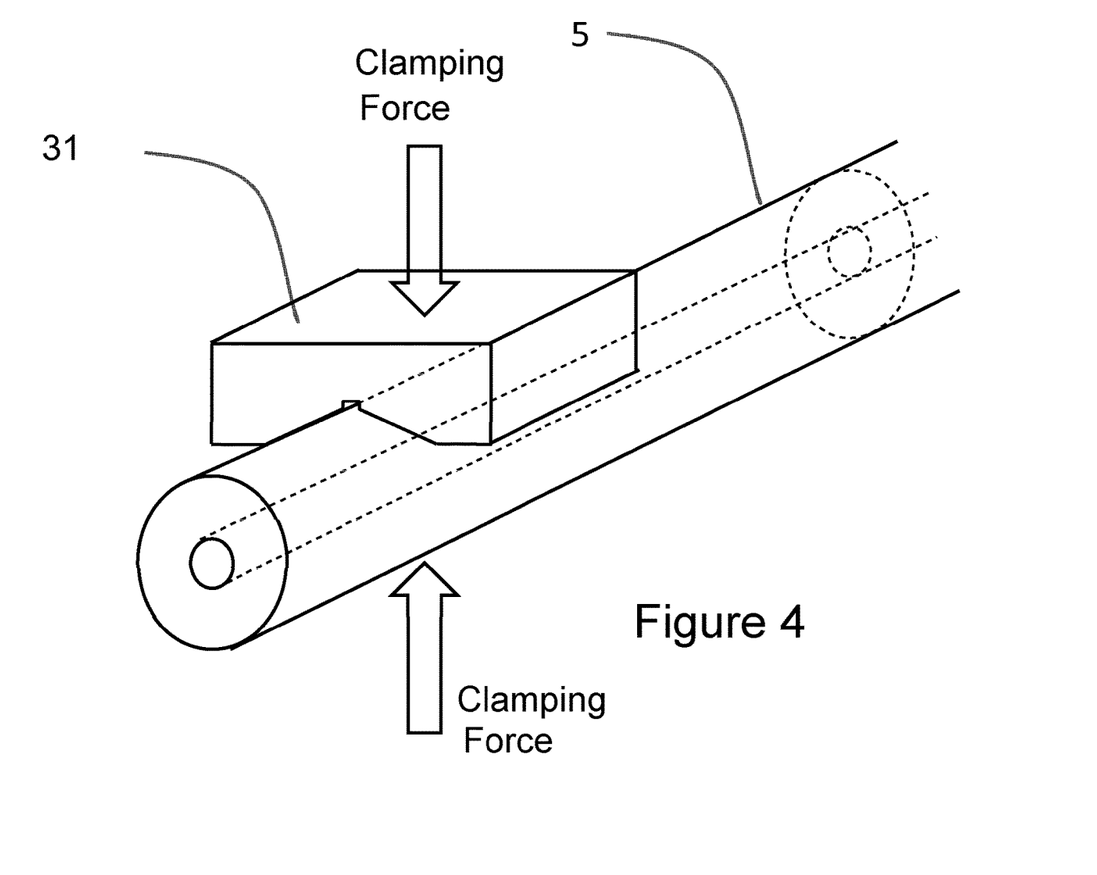
FIG. 4 shows details of a vee-clamp attachment member.

The other half of the system is the Opto-mechanical reference module or OMM 5 shown in FIG. 3. The OMM is mounted to the rifle barrel 3 using a precision and rigid vee-clamp 31 shown in detail in FIG. 4 or other precision, rigid mounting attachment member. The Vee clamp 31 is secured to the rifle barrel 3 with a clamping force CF that may be provided by a mechanical or magnetic clamp method. At manufacturing, the Optical reference 9 is aligned such that its normal is parallel to the vee-groove mechanical axis. The vee groove provides a mechanically accurate and kinematic method to align to the axis of the rifle barrel 3 and hence the barrel bore.

Figure 5A:
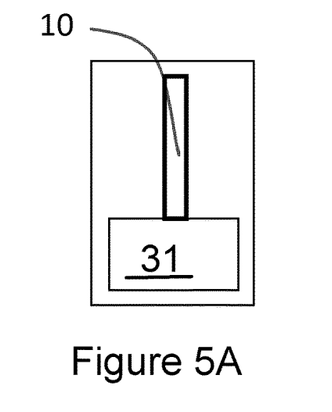
FIGS. 5A-5C show three embodiments of the opto-mechanical module (OMM).

The Optical reference 9 provides a visible target to be viewed through the riflescope 2 for bore-sighting. The preferred embodiment of the Optical reference is a flat high-reflecting mirror 10 shown in FIG. 5A. The vee-clamp or other clamping device 31 holds the mirror 10 exactly perpendicular to the barrel bore. In this case, the optical reference is the reflected image of the riflescope reticle itself. The riflescope may be adjusted so that the reflected and primary reticle images overlap. The mirror 10 may be reflective on two parallel faces to allow for a flip test of the OMM alignment. The mounted OMM can also be flipped 180 degrees on the rifle barrel as an in-situ method to verify that the reflective mirror reference provides the same answer when used both ways. This test verifies that the vertical tilt of the OMM mirror is parallel to the vee groove and the rifle barrel.

Figure 5B:
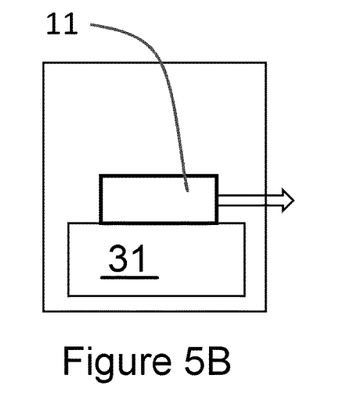
Figure 5C:
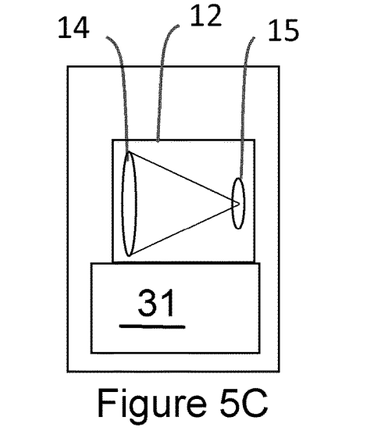

FIGS. 5B and 5C show two alternate embodiments of the OMM. FIG. 5B uses an optical reference laser 11 to illuminate a target, and FIG. 5C shows an embodiment where the OMM includes an optical reference autocollimator 12 that contains a lens 14 and an internal target reticle 15.

Figure 6A:
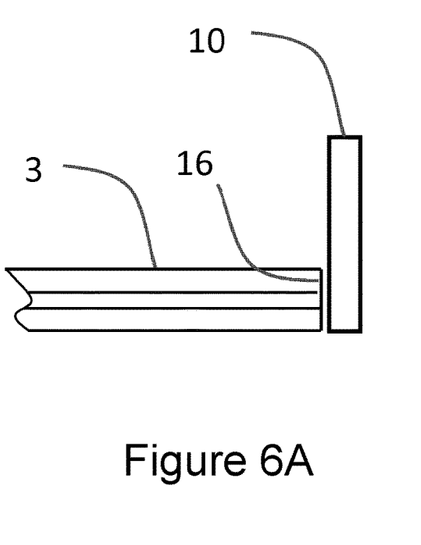
FIGS. 6A-6B shows two alternate methods of mounting a reference mirror on a rifle barrel.
Figure 6B:
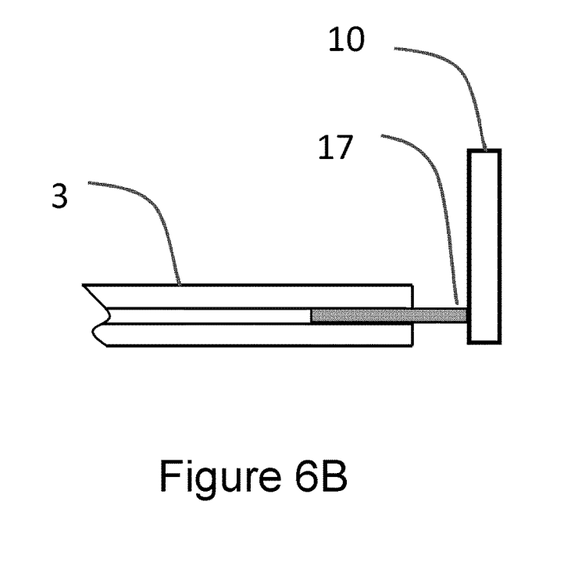

FIGS. 6A and 6B show two alternate embodiments that can be used to mount the OMM. FIG. 6A shows a muzzle-mounted mirror, and FIG. 6B shows a barrel mandrel mirror mount. In FIG. 6A, a reference mirror 10 can be mounted to the muzzle 16 of the rifle barrel 3. In FIG. 6B, the reference mirror 10 is mounted to the rifle barrel 3 with an inserted barrel mandrel 17.

Figure 7A:
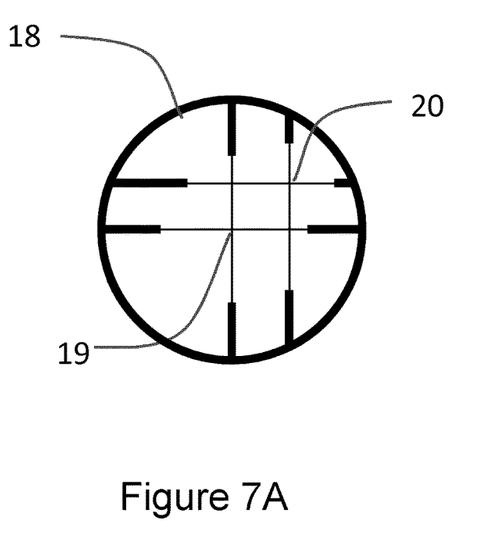
FIG. 7A shows a mis-aligned reference image.
Figure 7B:
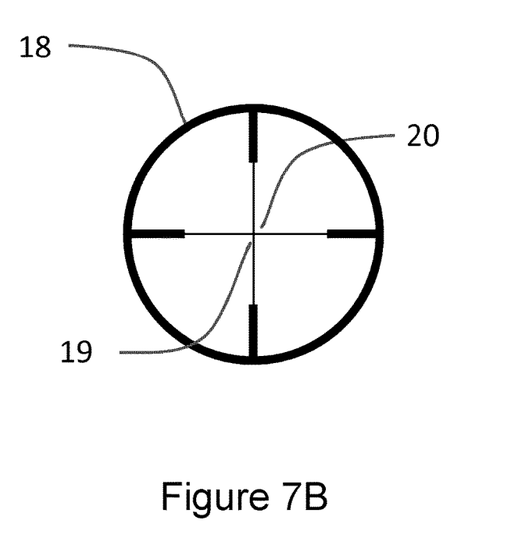
FIG. 7B shows an aligned reference image.

The first step of the boresighting of the rifle scope is accomplished by adjusting the reticle of the riflescope to align the primary and reflected images of the reticle. FIGS. 7A-7B show the dual reticle image for that the barrel mounted mirror provides. In FIG. 7A, the direct image of the scope reticle 19 can be seen as is typical for a riflescope. Misaligned from that reticle image is a secondary reticle image 20 that is the reflected reticle image which carries twice the angular misalignment of the scope to the barrel. The riflescope reticle knobs are adjusted so that the two images overlap as shown in FIG. 7B. Once this first step is accomplished the optical axis of the rifle scope and reticle are aligned parallel to the cylinder defined by the outer diameter of the barrel.

For a parallel barrel the final bore-sighting is accomplished by dialing in the traditional ballistic offsets related to the scope height above the barrel and the speed and gravitational ballistic drop to the desired zero range. Conventional variables of any ballistic calculation can be used.

The offset of the scope height over the zero distance is calculated as follows: Scope angle=scope height/zero distance.

As an example, a 3-inch scope offset height over 100-yard range would be approximately 3 minutes of arc adjustment for the scope height (1 MOA=1.009" over 100 yards). The scope is tilted downward to raise the point of impact to compensate for the scope height.

The other physical effect is the ballistic drop which is nothing more than the gravitational drop that occurs over the transit time to the target. The drop is given by:

Drop=½*g*(transit time)$^2$

Where g is the acceleration of gravity, 9.81 meters/s$^2$, or 32.2 feet/sec$^2$

Drop angle=Drop/zero distance.

As an example, a projectile traveling an average of 3000 ft/second takes 0.1 seconds to travel 100 yards.

Drop=0.5*(32.2 feet/sec$^2$)*(0.1 second)$^2$=0.161 feet=1.92 inches

Drop angle=0.161 feet/300 feet=0.537 milli-radians=1.85 minutes or arc.

From these calculations it can be seen that for a typical rifle (various scope height and bullet speeds) to obtain a 100-yard ballistic zero, the scope will aim 4-6 inches low of an orientation parallel to the barrel. Other factors to consider are tapered barrel in which case half the taper angle will need to be subtracted from the calculated angles for scope height and ballistic drop. The tapered barrel points the vee-groove downward by half the taper angle since we mate to the top outer diameter of the barrel.

Returning to FIGS. 5B and 5C, alternative embodiments of the OMM are shown. In FIG. 5B, a laser 11 can provide an optical reference by emitting a beam away from the scope at a distant target. Since the laser is aligned parallel to the vee-grove at manufacturing, the laser beam will be emitted parallel to the rifle barrel for an optical reference target. In FIG. 5C, the third embodiment of the optical reference is shown to be an autocollimator 12 that includes a lens 14 and a target reticle 15 that are once again factory-aligned such that the optical axis of the autocollimator is parallel to the vee-groove.

There are barrel types for which the outer surface of the barrel may not be true to the barrel bore. Tapered barrels and carbon-fiber-wrapped barrels are problematic. Most tapered barrels can be successfully addressed the method or the present invention using simple arithmetic that considers the barrel taper with arithmetic offset of the line-of-sight with respect to the outer diameter of the barrel. Also, the carbon fiber wrapped barrel can still be aligned if a precision muzzle device such as a compensator, brake, or suppressor are in place (these are very common). Another possible problem relates to an AR platform is that the barrel is recessed within the foregrip of the platform and therefore inaccessible for registration. Once again, an installed precision muzzle device can be used to establish the barrel axis.

Figure 8:
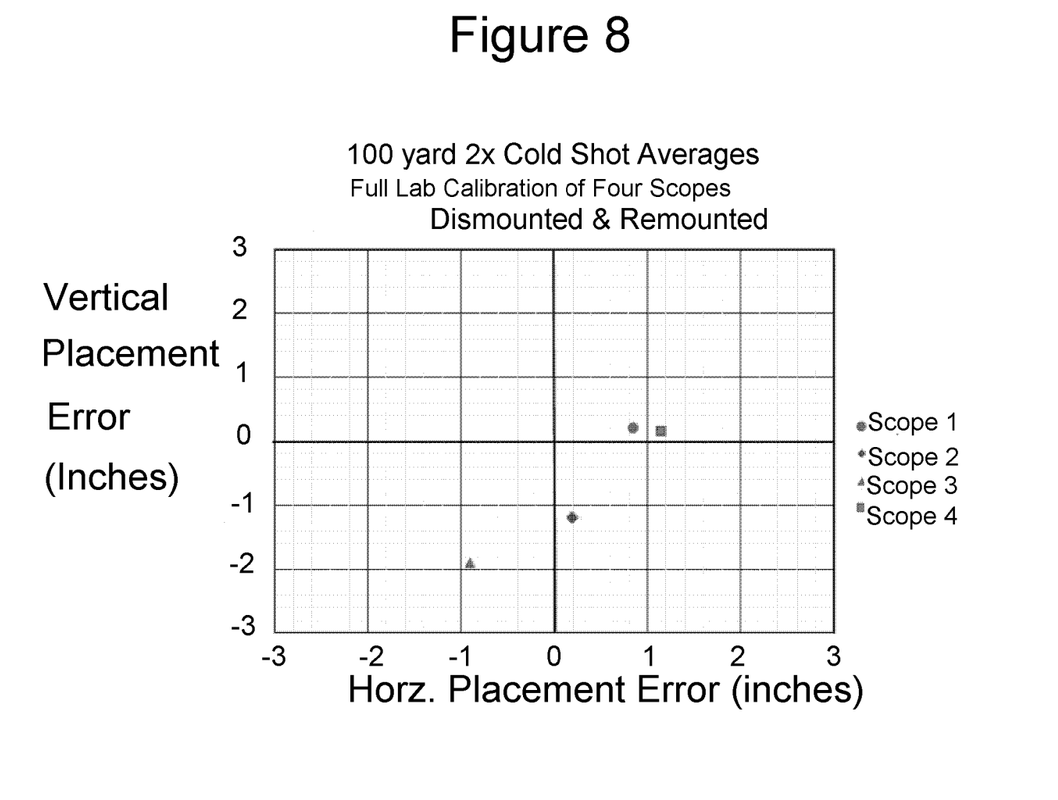
FIG. 8 shows results of a field test.

In tests, four different riflescopes were mounted to a precision rifle with a picatinny rail for mounting one-piece scope assemblies. For each scope a 100-yard zero aiming was established using the methods described herein. Each scope and scope mount combination were then removed from the picatinny rail secured for transport. At the shooting range, each scope was resecured to the same rail orientation and torqued down properly for best reproducibility. Without any further adjustments, Two "cold shots" were fired with each scope at 100 yards, and the error in the target hits were recorded and plotted in FIG. 8. The results show that all shots were within 2 inches at 100 yards range, and some were within 1 inch without further calibration.

Several descriptions and illustrations have been presented to aid in understanding the present invention. A person with skill in the art will realize that numerous changes and variations may be made without departing from the spirit of the invention. Each of these changes and variations is within the scope of the present invention.

We claim:

1. An apparatus for aligning a riflescope on a rifle having a barrel with a barrel bore and a muzzle, the rifle having a mounted adjustable riflescope, the riflescope having an eyepiece end, a riflescope reticle, and an objective end, the apparatus comprising:

an illumination multiplexer placed in proximity to, and aligned with, the eyepiece, the illumination multiplexer including a light source, or cooperating with an external light source, followed by a beam splitter, the illumination multiplexer constructed to supply an outgoing beam passing through the beam-splitter into the eyepiece, the outgoing beam passing through the riflescope reticle and along the barrel to an opto-mechanical module;

the opto-mechanical module being attachable to the barrel between the objective end of the riflescope end the muzzle, the opto-mechanical module having a vee-clamp attachment member, the vee-clamp attachment member cooperating with the barrel rigidly to hold the opto-mechanical module to the barrel, and to align the opto-mechanical module with the barrel bore, the opto-mechanical module including an optical reference constructed to provide a return light beam aligned with the barrel bore;

the return beam containing a first image, the first image being an image of the riflescope reticle, or an image of a target reticle, the return beam passing in a reverse direction through the objective end of the riflescope, the riflescope reticle and the eyepiece, to produce a composite return beam, the composite return beam containing superposition of the first image and a second image, the second image being a shadow image of the riflescope reticle, the composite return beam entering the beam splitter;

the beam splitter being configured to provide a lateral reference image of the composite return beam containing both the first and second images;

the apparatus being constructed so that when the riflescope is misaligned with the rifle bore, the first and second images are both visible and show two reticle images misaligned with one-another, and when the riflescope is aligned with the rifle bore, the first and second images align with one-another, and only one reticle image is seen.

2. The apparatus for aligning a rifilescope on a rifle of claim 1, wherein the first image is an image of the riflescope reticle.

3. The apparatus for aligning a rifilescope on a rifle of claim 1, wherein the first image is an image of a target reticle.

4. The apparatus for aligning a rifilescope on a rifle of claim 1 wherein the light source is chosen from the group consisting of a flashlight, a laser and an LED.

5. The apparatus for aligning a rifilescope on a rifle of claim 1 wherein the illumination multiplexer further includes a diffuser.

6. The apparatus for aligning a rifilescope on a rifle of claim 1 wherein the beam splitter is a polarized beam splitter, and the illumination multiplexer further includes a quarter wave plate oriented approximately 45 degrees with respect to the return beam.

7. The apparatus for aligning a rifilescope on a rifle of claim 1 wherein the opto-mechanical module contains a reference laser and a target.

8. The apparatus for aligning a rifilescope on a rifle of claim 1 wherein the opto-mechanical module contains an auto-collimator and a target reticle.

9. The apparatus for aligning a rifilescope on a rifle of claim 1 wherein the light source is chosen from the group consisting of a flashlight, a laser and an LED.

10. The apparatus for aligning a rifilescope on a rifle of claim 1 wherein the illumination multiplexer further includes a diffuser.

11. An apparatus for aligning a rifilescope on a rifle having a barrel with a barrel bore and a muzzle, the rifle having a mounted adjustable riflescope, the riflescope having an eyepiece end, a lighted etched glass riflescope reticle, and an objective end, the apparatus comprising:

the opto-mechanical module being attachable to the barrel between the objective end of the riflescope end the muzzle, the opto-mechanical module including a vee-clamp, the vee-clamp constructed to grip the barrel rigidly to hold the opto-mechanical module to the barrel, and to align the opto-mechanical module with the barrel bore, the opto-mechanical module including a mirror constructed to provide a return light beam from the lighted etched glass reticle, the return beam aligned with the barrel bore;

the return beam containing a first image, the first image being a reflected image of the riflescope reticle, the return beam passing in a reverse direction through the objective end of the riflescope, the riflescope reticle and the eyepiece to produce a composite return beam, the composite return beam containing superposition of the first image and a second image, the second image being a shadow image of the riflescope reticle, the composite return beam enter the beam splitter;

the apparatus being constructed so that when the riflescope is misaligned with the rifle bore, the first and second images are both visible in the eyepiece and show two reticle images misaligned with one-another, and when the riflescope is aligned with the rifle bore, the first and second images align with one-another, and only one reticle image is seen.

12. The apparatus for aligning a rifilescope on a rifle of claim 11 wherein the mirror is a flat mirror.

13. The apparatus for aligning a rifilescope on a rifle of claim 12, wherein the flat mirror is two-sided and reversible.

\* \* \* \* \*